(12) United States Patent
Hoffman et al.

(10) Patent No.: US 10,247,280 B2
(45) Date of Patent: Apr. 2, 2019

(54) FOUR PLANETARY-GEARSET STEP-RATIO AUTOMATIC TRANSMISSION

(71) Applicant: FORD GLOBAL TECHNOLOGIES, LLC, Dearborn, MI (US)

(72) Inventors: Donald Edward Hoffman, Canton, MI (US); Gregory Daniel Goleski, Rochester Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 290 days.

(21) Appl. No.: 14/282,274

(22) Filed: May 20, 2014

(65) Prior Publication Data

US 2015/0337925 A1 Nov. 26, 2015

(51) Int. Cl.
*F16H 3/66* (2006.01)

(52) U.S. Cl.
CPC ............... *F16H 3/66* (2013.01); *F16H 3/666* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/2012; F16H 2200/0065; F16H 2200/2097; F16H 2200/2046
See application file for complete search history.

(56) References Cited

U.S. PATENT DOCUMENTS

| 7,276,011 | B2 | 10/2007 | Tabata et al. |
| 7,452,303 | B2 | 11/2008 | Seo |
| 7,488,269 | B2 | 2/2009 | Tabata et al. |
| 7,556,582 | B2 * | 7/2009 | Gumpoltsberger ....... F16H 3/66 475/271 |
| 7,731,625 | B2 * | 6/2010 | Phillips ..................... F16H 3/66 475/284 |
| 7,749,127 | B2 * | 7/2010 | Hart ........................ F16H 3/666 475/275 |
| 7,892,136 | B2 | 2/2011 | Kim |
| 7,892,138 | B2 | 2/2011 | Phillips et al. |
| 7,985,159 | B2 | 7/2011 | Phillips et al. |
| 7,998,013 | B2 | 8/2011 | Phillips et al. |

(Continued)

FOREIGN PATENT DOCUMENTS

DE 102011013906 A1 9/2012

OTHER PUBLICATIONS

Chinese Office Action dated Feb. 2, 2018 for Chinese Applicaton No. 201510255964.5, 7 pages.

*Primary Examiner* — David J Hlavka
(74) *Attorney, Agent, or Firm* — David Kelley; Brooks Kushman P.C.

(57) ABSTRACT

A four gearing-arrangement transmission having six shift-elements cooperatively engaging in combinations of three to provide nine forward speeds and one reverse speed. The transmission having a first gearing-arrangement with an end-gear fixedly coupled to a ground. A second gearing-arrangement with one end-gear fixedly coupled to an input and the other end-gear fixedly coupled to an interior-gear of the first gearing-arrangement. A third gearing-arrangement having an interior-gear fixedly coupled to an output. A fourth gearing-arrangement having a fourth interior-gear fixedly coupled to the input.

23 Claims, 3 Drawing Sheets

(56) References Cited

U.S. PATENT DOCUMENTS

| | | | |
|---|---|---|---|
| 8,021,265 B2* | 9/2011 | Phillips | F16H 3/66 475/317 |
| 8,052,567 B2 | 11/2011 | Hart et al. | |
| 8,210,981 B2 | 7/2012 | Bauknecht et al. | |
| 8,210,983 B2 | 7/2012 | Gumpoltsberger et al. | |
| 8,231,495 B2 | 7/2012 | Gumpoltsberger et al. | |
| 8,231,496 B2* | 7/2012 | Gumpoltsberger | F16H 3/66 475/275 |
| 8,231,501 B2 | 7/2012 | Gumpoltsberger et al. | |
| 8,241,170 B2 | 8/2012 | Gumpoltsberger et al. | |
| 8,241,171 B2 | 8/2012 | Gumpoltsberger et al. | |
| 8,246,504 B2* | 8/2012 | Gumpoltsberger | F16H 3/66 475/275 |
| 8,425,370 B2 | 4/2013 | Leesch et al. | |
| 8,444,524 B2* | 5/2013 | Gumpoltsberger | F16H 3/66 475/276 |
| 8,663,056 B2 | 3/2014 | Gumpoltsberger et al. | |
| 8,727,929 B2 | 5/2014 | Beck et al. | |
| 9,435,404 B2 | 9/2016 | Goleski et al. | |
| 2007/0072733 A1* | 3/2007 | Klemen | F16H 3/66 475/280 |
| 2008/0070740 A1* | 3/2008 | Gumpoltsberger | F16H 3/66 475/276 |
| 2008/0293537 A1* | 11/2008 | Phillips | F16H 3/663 475/283 |
| 2012/0053008 A1* | 3/2012 | Beck | F16H 3/66 475/276 |
| 2013/0040776 A1 | 2/2013 | Mellet et al. | |
| 2013/0310212 A1 | 11/2013 | Hart et al. | |

* cited by examiner

FIG. 1

| | S1 | S2 | S3 | S4 | S5 | S6 | Ratio | Step |
|---|---|---|---|---|---|---|---|---|
| Rev | X | X | | | X | | -4.932 | |
| 1st | | X | | X | X | | 5.503 | |
| 2nd | | | X | X | X | | 3.333 | 1.651 |
| 3rd | | X | X | | X | | 2.315 | 1.440 |
| 4th alt 1 | | (o) | | | X | X | 1.661 | 1.394 |
| 4th alt 2 | | | (o) | | X | X | 1.661 | 1.394 |
| 5th | | X | X | | | X | 1.211 | 1.372 |
| 6th | | | X | X | | X | 1.000 | 1.211 |
| 7th | | X | | X | | X | 0.865 | 1.156 |
| 8th | X | | | X | | X | 0.717 | 1.207 |
| 9th | X | X | | | | X | 0.602 | 1.192 |
| Betas: | GA-1: | 2.273 | GA-2: | 2.130 | GA-3: | 2.333 | GA-4: | 2.529 |

(o) Optional

FOUR PLANETARY-GEARSET STEP-RATIO AUTOMATIC TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed to run at a quieter, more fuel efficient cruising speed. Typically, a transmission has a housing mounted to the vehicle structure, an input-shaft driven by an engine crankshaft through a clutch or torque converter, and an output-shaft driving the vehicle wheels, often via a differential assembly which permits the left and right wheel to rotate at slightly different speeds as the vehicle turns.

An automatic transmission, also called an automatic gearbox, is a type of motor vehicle transmission that can automatically change gear ratios as the vehicle moves, freeing the driver from having to shift gears manually. Most automatic transmissions have a defined set of gear ranges, or step-ratios. Typically varying gear-elements of compound epicyclic planetary-gearsets are coupled together by varying shift-elements within the transmission to provide the step-ratios. The shift-elements may be actuated by hydraulic servos controlled by a valve body. Hydraulic fluid, or automatic transmission fluid, may be used to actuate and engage the shift-elements.

SUMMARY

One aspect of this disclosure is directed to a transmission having four planetary-gearsets each having gear-elements including a sun, a carrier, and a ring. In this transmission the first planetary-gearset sun is fixedly coupled to a ground and the first planetary-gearset carrier is fixedly coupled to the second planetary-gearset ring. A first shift-element selectively couples the second planetary-gearset carrier to the ground. A second shift-element selectively couples the first planetary-gearset ring to one of the third planetary-gearset gear-elements. An input is fixedly coupled to the second planetary-gearset sun and to one of the fourth planetary-gearset gear-elements. An output is fixedly coupled to another of the third planetary-gearset gear-elements.

The second shift-element of the transmission may selectively couple the first planetary-gearset ring to the third planetary-gearset sun. The second shift-element may also selectively couple the first planetary-gearset ring to the fourth planetary-gearset sun. The input may be fixedly coupled to the fourth planetary-gearset carrier. The output may be fixedly coupled to the third planetary-gearset carrier.

A third shift-element of the transmission may selectively couple two second planetary-gearset gear-elements. The third shift-element may selectively couple the second planetary-gearset carrier to the second planetary-gearset sun. A fourth shift-element may selectively couple the second planetary-gearset carrier to the third planetary-gearset sun. The fourth shift-element may also, or alternatively, selectively couple the second planetary-gearset carrier to the fourth planetary-gearset sun.

A fifth shift-element of the transmission may selectively couple another third planetary-gearset gear-element to the ground. The fifth shift-element may selectively couple the third planetary-gearset ring to the ground. A sixth shift-element may selectively couple another fourth planetary-gearset gear-element to the output. The sixth shift-element may selectively couple the fourth planetary-gearset ring to the output.

Another aspect of this disclosure is directed to a transmission having a first, second, third and fourth planetary-gearset. The first planetary-gearset having a first end-gear fixedly coupled to a ground, a second end-gear, and a first interior-gear. The second planetary-gearset having a third end-gear fixedly coupled to an input, a fourth end-gear fixedly coupled to the first interior-gear, and a second interior-gear. The third planetary-gearset having a third interior-gear fixedly coupled to an output. The fourth planetary-gearset having a fourth interior-gear fixedly coupled to the input.

A first shift-element of the transmission may selectively couple the second interior-gear to the ground. A second shift-element may selectively couple the second end-gear to a fifth end-gear of the third planetary-gearset. A third shift-element may selectively couple two of the third end-gear, the fourth end-gear and the second interior-gear. The third shift-element may selectively couple the third end-gear to the second interior-gear.

A fourth shift-element of the transmission may selectively couple the second interior-gear to the fifth end-gear. A fifth shift-element may selectively couple a sixth end-gear of the third planetary-gearset to the ground. A seventh end-gear of the fourth planetary-gearset may be fixedly coupled to the fifth end-gear.

A sixth shift-element of the transmission may selectively couple an eighth end-gear of the fourth planetary-gearset to the output. The first, second, third, fourth, fifth, and sixth shift-elements may engage in combinations of three to provide nine forward speeds and one reverse speed.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
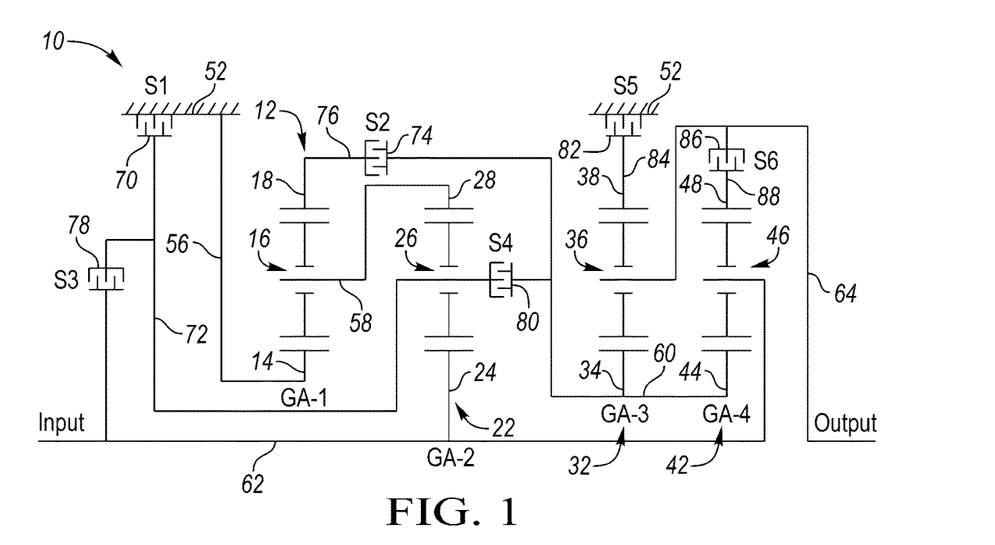
FIG. 1 is a schematic diagram of a first transmission.

FIG. 1 shows a schematic diagram of a first transmission 10. The schematic diagramming of a transmission may also be referred to as a stick diagram and the lines on the stick diagram may represent gearing-arrangements made up of gear-elements, shafts associated with the gear-elements, and the interconnection of the shafts with other shafts, gear-elements, or a transmission housing. A shaft may be any physical object used to transfer movement (or hold movement) of an associated gear-element to another location, or to move (or hold) an associated gear-element in response to the shaft receiving that motion (or non-motion) from another location.

A gearing-arrangement is a collection of meshing gear-elements configured to impose specified speed relationships among the gear-elements. The speed relationships among the gear-elements may be determined by the number of teeth of the respective gear-elements. A linear speed relationship (LSR) exists among an ordered list of gear-elements when i) the first and last gear-element in the group are constrained to have the most extreme speeds, ii) the speeds of the remaining gear-elements are each constrained to be a weighted average of the first and last gear-element, and iii) when the speeds of the gear-elements differ, they are constrained to be in the listed order, either increasing or decreasing. A discrete ratio or step-ratio transmission has gearing-arrangements that selectively impose a number of discrete speed ratios between an input-shaft and an output-shaft.

A gearing-arrangement may be a planetary-gearset having as gearing-elements at least one planet gear disposed between a sun gear and a ring gear. In a simple planetary gearset, teeth of the planets mesh with teeth of both the sun and ring simultaneously. The planets are associated with a shaft referred to as a carrier. A simple planetary gearset is a type of gearing-arrangement that imposes a LSR among the sun, the carrier, and the ring. The order of the LSR is from the sun to the carrier to the ring, or vice versa, and thus the linear speed relationship of the associated shafts follow. If the shaft associated with the sun is held with no rotation (braked), then the shaft associated with the ring would have a greater rotational speed than the carrier. Similarly, if the shaft associated with the ring is braked, then the shaft associated with the sun would have a greater rotational speed than the carrier.

A double-pinion planetary-gearset also imposes a LSR between a sun, carrier, and ring, but in a different order from a simple planetary-gearset. In a double-pinion planetary gearset the carrier is associated with at least a pair of planets which are disposed between the sun and the ring. Teeth of the first planet mesh with teeth of the sun (without contacting the ring), teeth of the second planet mesh with teeth of the ring (without contacting the sun), and teeth of both planets mesh with each other. The order of the LSR in a double-pinion planetary-gearset is from the sun to the ring to the carrier. Thus, if the shaft associated with the sun is braked, then the carrier will have a greater rotational speed than the shaft associated with the ring. If the carrier is braked, then the shaft associated with the sun will have a greater rotational speed than the ring.

Following this relationship, a simple planetary-gearset may be replaced with a double-pinion planetary-gearset by swapping shafts from the ring to the carrier (which may also require changing the number of teeth on the respective gear-elements to maintain the same speed relationships). In other words, the linear speed relationship of a gearing-arrangement may be "turned inside-out" by switching from a simple planetary-gearset to a double-pinion planetary-gearset. This interchangeability provides that the extreme speed gear-elements (fastest or slowest in comparison to each other) may be referred to as end-gears, while the gear-element that experiences a speed within the extreme speed gear-elements may be referred to as an interior-gear. In the case of a simple planetary-gear set, the sun-gear and the ring-gear would be the end-gears while the carrier would be the interior-gear, whereas in the double-pinion gearing-arrangement, the sun-gear and the carrier would be the end-gears, while the ring-gear would be the interior-gear.

A group of gear-elements are fixedly coupled to one another if they are constrained to have the same speed in all operating conditions. The multiple gear-elements would be associated with the same shaft, or one shaft would be considered to be associated with a number of gear-elements. Gear-elements may be fixedly coupled by spline connections, welding, press fitting, machining from a common solid, or other means. Slight variations in rotational displacement between fixedly coupled gear-elements may occur such as displacement due to lash or shaft compliance. A single gear-element fixedly coupled to the transmission housing is constrained such that it does not experience rotation and may be referred to as a ground.

A gear-element or shaft may be selectively coupled to another gear-element, shaft or to the transmission housing by a shift-element when the shift-element constrains them to rotate (or to not rotate) at the same speed whenever the shift-element is fully engaged. A shift-element may also be referred to as a clutch. In the case of selectively coupling two gear-elements, they have different speeds when the clutch is not fully engaged. The two gear-elements may be considered to be associated with two different shafts regardless of the clutch engagement state. A clutch that holds a gear-element or shaft against rotation by selectively connecting it to structure that does not rotate, such as the transmission housing, may be referred to as a brake. Non-rotating structure, such as the transmission housing, may be referred to as a ground. Clutches may be actively controlled devices such as hydraulically or electrically actuated clutches or brakes or they may be passive devices such as one way clutches or brakes.

First transmission 10 has a first planetary-gearset 12, also referred to as a first gearing-arrangement (GA-1). The first planetary-gearset 12 has gear-elements such as a first planetary-gearset sun 14, a first planetary-gearset carrier 16, and a first planetary-gearset ring 18. The first planetary-gearset 12 is shown as a simple planetary-gearset and as such the first planetary-gearset sun 14 may also be referred to as a first end-gear 14. The first planetary-gearset carrier 16 may be referred to as a first interior-gear 16, and the first planetary-gearset ring 18 may be referred to as a second end-gear 18. The numerical ordering of gearsets and/or gear-elements in this application does not imply a speed relationship or sequential order, it is merely used to identify one from another and chosen in order of the description. As such, a first end-gear could be a ring or carrier, depending on the gearing-arrangement, and the second end-gear would be the next end-gear to be described.

A second planetary-gearset 22, also referred to as a second gearing-arrangement (GA-2), is shown as a simple planetary-gearset having gear-elements of a second planetary-gearset sun 24, a second planetary-gearset carrier 26, and a second planetary-gearset ring 28. The second planetary-gearset sun 24 may be referred to as a third end-gear 24, the second planetary-gearset carrier 26 may be referred to as a second interior-gear 26, and the second planetary-gearset ring 28 may be referred to as a fourth end-gear 28.

A third planetary-gearset 32, also referred to as a third gearing-arrangement (GA-3), is shown as a simple planetary-gearset having gear-elements such as a third planetary-gearset sun 34, a third planetary-gearset carrier 36, and a third planetary-gearset ring 38. The third planetary-gearset sun 34 may be referred to as a fifth end-gear 34, the third planetary-gearset carrier 36 may be referred to as a third interior-gear 36, and the third planetary-gearset ring 38 may be referred to as a sixth end-gear 38.

A fourth planetary-gearset 42, also referred to as a fourth gearing-arrangement (GA-4), is shown as a simple planetary-gearset having gear-elements such as a fourth planetary-gearset sun 44, a fourth planetary-gearset carrier 46, and a fourth planetary-gearset ring 48. The fourth planetary-gearset sun 44 may be referred to as a seventh end-gear 44, the fourth planetary-gearset carrier 46 may be referred to as a fourth interior-gear 46, and the fourth planetary-gearset ring 48 may be referred to as an eighth end-gear 48.

First transmission 10 has a housing 52, also referred to as a ground 52. The housing 52 provides a non-rotating structure that a gear-element may be fixedly or selectively coupled to. A shift-element or clutch may be configured to selectively couple a gear-element and/or shaft to the housing in order to hinder rotation of the gear-element or shaft. A shift-element that couples a gear-element or shaft to a ground is often referred to as a brake.

The first planetary-gearset sun 14 is shown fixedly coupled to the ground 52. A first shaft 56 may fixedly couple the first planetary-gearset sun 14 to the ground 52. The first gearing-arrangement 12 is shown as a simple planetary-gearset, and as such grounding the first planetary-gearset sun 14 provides that the any shaft associated with the first planetary-gearset ring 18 will have a speed faster than the first planetary-gearset carrier 16. As mentioned above, however, the shaft speed correlation may be swapped, such that the ring could be grounded and any shaft associated with the sun would then have a speed faster than the carrier. Thus the associated shaft and the ground could be swapped from a sun to a ring (and the teeth of the gears modified as necessary to maintain the linear speed relationship).

This relationship is further enhanced by the ability to swap out a simple planetary-gearset with a double-pinion planetary-gearset. Now the order would be from the sun to the ring to the carrier. Grounding the sun would provide for the carrier to have a faster speed than a shaft associated with the ring and grounding the carrier would provide for a shaft associated with the sun to have a faster speed than a shaft associated with the ring. This ability to swap the gear-elements and planetary-gear types provides that broader terminology may be used to define the relationship, in that the first planetary-gearset 12 has an end-gear (e.g. a first end-gear 14) fixedly coupled to a ground 52.

The first planetary-gearset carrier 16 is fixedly coupled to the second planetary-gearset ring 28. A second shaft 58 may be used to fixedly couple the first planetary-gearset carrier 16 to the second planetary-gearset ring 28. It may also be stated that an interior-gear of the first gearing-arrangement 12 (e.g. the first interior-gear 16) is fixedly coupled to the fourth end-gear 28. The fourth end-gear 28 is shown here as a ring on a simple planetary-gearset, but it could be a carrier on a double-pinion planetary-gearset, or a sun on either a simple or double-pinion planetary-gearset.

The third planetary-gearset sun 34 is fixedly coupled to the fourth planetary-gearset sun 44. A third shaft 60 may be used to fixedly couple the third planetary-gearset sun 34 to the fourth planetary-gearset sun 44. Also, as with above, this relationship could also be described as an end-gear from the third gearing-arrangement 32 (e.g. the fifth end-gear 34) being fixedly coupled to an end-gear of the fourth gearing-arrangement 42 (e.g. the seventh end-gear 44).

An input shaft 62, or simply referred to as an input 62, is fixedly coupled to the second planetary-gearset sun 24, or an end-gear of the second gearing-arrangement 22 (e.g. the third end-gear 24). The input 62 is also fixedly coupled to one of the fourth planetary-gearset 42 gear-elements 44, 46, 48. In this case, the input 62 is fixedly coupled to the fourth planetary-gearset carrier 46. This could also be stated as the input 62 being fixedly coupled to an interior-gear of the fourth gearing-arrangement 42 (e.g. the fourth interior-gear 46).

An output shaft 64, or simply referred to as an output 64, is fixedly coupled to a third planetary-gearset gear-element 34, 36, 38. The output 64 is fixedly coupled to the third planetary-gearset carrier 36. Stated more broadly, the output 64 is fixedly coupled to an interior-gear of the third gearing-arrangement 32 (e.g. the third interior-gear 36).

A first shift-element 70 selectively couples the second planetary-gearset carrier 26 to the ground 52. A fourth shaft 72 may be fixedly coupled to the second planetary-gearset carrier 26 and one side of the first shift-element 70. The first shift-element 70 may be referred to as a brake. Stated more broadly, the first shift-element 70 selectively couples an interior-gear of the second gearing-arrangement 22 (e.g. the second interior-gear 26) to the ground 52. Engagement of the first shift-element 70 results in the second planetary-gearset carrier 26 remaining stationary and not rotating. Engagement of the first shift-element 70 results in the second interior-gear 26 being fixed (i.e. having substantially no speed) and one end-gear (e.g. the fourth end-gear 28) rotating in the opposite direction of the other end-gear (e.g. the third end-gear 24).

A second shift-element 74 selectively couples the first planetary-gearset ring 18 to one of the third planetary-gearset gear-elements 34, 36, 38. The second shift-element 74 selectively couples the first planetary-gearset ring 18 to the third planetary-gearset sun 34. A fifth shaft 76 may be fixedly coupled to the first planetary-gearset ring 18 and one side of the second shift-element 74. The third shaft 60 may be fixedly coupled to the third planetary-gearset sun 34 and to the other side of the second shift-element 74. Engagement of the second shift-element 74 couples the third shaft 60 with the fifth shaft 76 causing the two shafts to rotate at substantially the same speed resulting in the gear-elements associated with those shafts to rotate at substantially the same speed. Stated more broadly, the second shift-element 74 selectively couples an end-gear of the first gearing-arrangement 12 (e.g. the second end-gear 18) to rotate at substantially the same speed as an end-gear of the third gearing-arrangement 32 (e.g. the fifth end-gear 34).

In transmission 10, the second shift-element also selectively couples the first planetary-gearset ring 18 to one of the fourth planetary-gearset gear-elements 44, 46, 48. The second shift-element 74 is shown selectively coupling the first planetary-gearset ring 18 to the fourth planetary-gearset sun 44. Stating this more broadly, the second shift-element 74 selectively couples end-gears of the first, third and fourth gearing-arrangements 12, 32, 42 (e.g. the second, fifth and seventh end-gears 18, 34, 44) such that they all rotate at substantially the same speed.

A third shift-element 78 selectively couples two of the second planetary-gearset gear-elements 24, 26, 28. The third shift-element 78 may also be referred to as a lock-up clutch.

Engaging a shift-element to couple two of three gear-elements in a planetary-gearset results in all of the gear-elements of the planetary-gearset rotating (or not rotating) at the same speed, regardless of which two gear-elements are coupled together. The third shift-element 78 in transmission 10 selectively couples the second planetary-gearset sun 24 with the second planetary-gearset carrier 26. The third shift-element 78 may accomplish this by selectively coupling the fourth shaft 72 with the input shaft 62. In other words, the third shift-element 78 selectively couples two of the end-gears (e.g. the third and fourth end-gears 24, 28) or an interior-gear to one of the end-gears (e.g. the second interior-gear 26 to either the third and fourth end-gears 24, 28).

A fourth shift-element 80 selectively couples the second planetary-gearset carrier 26 to the third planetary-gearset sun 34 and the fourth planetary-gearset sun 44. The fourth shift-element 80 may selectively couple the third shaft 60 with the fourth shaft 72. Stated more broadly, the fourth shift-element 80 selectively couples an interior-gear of the second gearing-arrangement 22 (e.g. the second interior-gear 26) to an end-gear of the third gearing-arrangement 32 (e.g. the fifth end-gear 34) and an end-gear of the fourth gearing-arrangement 42 (e.g. the seventh end-gear 44).

A fifth shift-element 82 selectively couples a third planetary-gearset gear-element 34, 36, 38 to the ground 52. The fifth shift-element 82 selectively couples the third planetary-gearset ring 38 to the ground 52. The fifth shift-element 82 may be referred to as a brake. A sixth shaft 84 may be fixedly coupled to the third planetary-gearset ring 38 and to one side of the fifth shift-element 82. Engagement of the fifth shift-element 82 results in the third planetary-gearset ring 38 remaining stationary and not rotating. Stated more broadly, the fifth shift-element 82 selectively couples an end-gear of the third gearing-arrangement 32 (e.g. the sixth end-gear 38) to the ground 52. Engagement of the fifth shift-element 82 results in one end-gear (e.g. the sixth end-gear 38) being fixed (i.e. having substantially no speed) and the other end-gear (e.g. the fifth end-gear 34) having a speed faster than the interior-gear (e.g. the third interior-gear 36).

A sixth shift-element 86 selectively couples a fourth planetary-gearset gear-element 44, 46, 48 to the output 64. The sixth shift-element 86 selectively couples the fourth planetary-gearset ring 48 to the output 64. A seventh shaft 88 may be fixedly coupled to the fourth planetary-gearset ring 48 and to one side of the sixth shift-element 86. Engagement of the sixth shift-element 86 results in the output 64 and the fourth planetary-gearset ring 48 rotating at substantially the same speed. Stated broader, the sixth shift-element 86 selectively couples the output 64 to an end-gear of the fourth gearing-arrangement 42 (e.g. the eighth end-gear 48) resulting in the output 64 having substantially the same speed as the end-gear it is coupled to.

Figure 2:
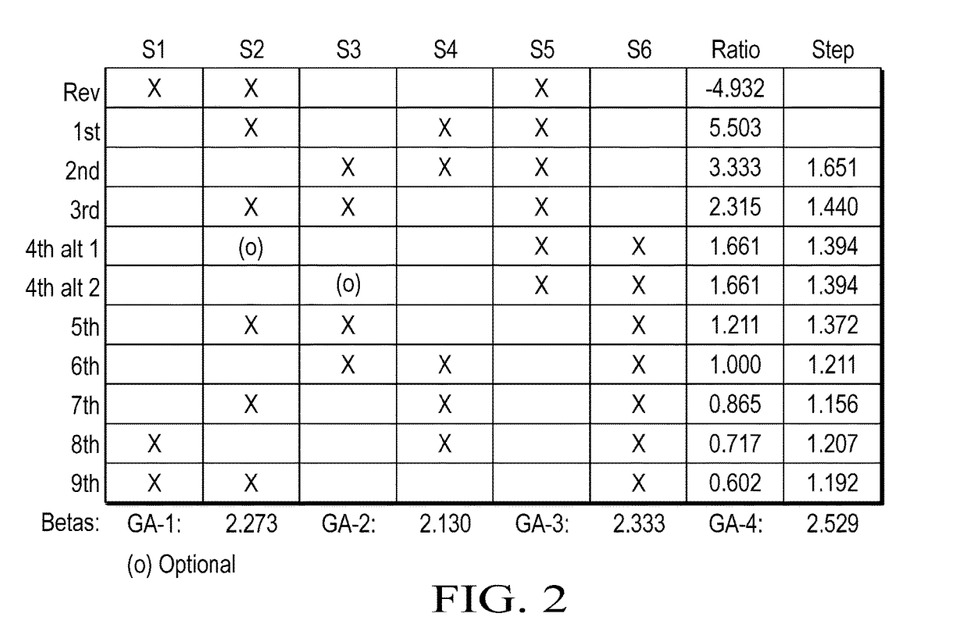
FIG. 2 is a clutch chart for the transmission in FIG. 1.

FIG. 2 illustrates a shift-element engagement chart, also referred to as a clutch chart, for the first transmission 10. The columns represent the respective shift-elements and the rows represent transmissions speeds. An 'X' in a cell indicates that the shift-element of that column is engaged (in combination with others) to establish that speed. An '(o)' in a cell indicates the optional engagement of that specific shift-element for that speed. An automatic transmission may 'shift gears' from one speed to another by selectively engaging and/or disengaging clutches. The first transmission 10 may have the shift-elements 70, 74, 78, 80, 82, 86 engaged in varying combinations of three to establish nine forward speeds and one reverse speed between input 62 and the output 64. The second and third shift-elements 74, 78 may be optionally engaged as one of the three engaged shift-elements to provide a fourth speed.

Transitioning or 'shifting' between speeds may follow a one-off/one-one disengagement/engagement strategy in which only one of the three clutches is disengaged with a new single clutch being engaged to change to the next speed. For example, the first transmission 10 may start in a first speed by engaging the second, fourth and fifth shift-elements 74, 80, 82. The first transmission may then shift to a second speed by disengaging the second shift-element 74 and engaging the third shift-element 78. Moving from a lower speed to a higher speed may be referred to as up-shifting. Moving from a higher speed to a lower speed may be referred to as down-shifting. Additional speeds may be up-shifted to or down-shifted from following a similar disengagement/engagement strategy.

Although a one-off/one-on disengagement/engagement strategy is shown, multiple clutch disengagements with simultaneous or time spaced multiple clutch engagements may also be used. Multiple clutch disengagements with simultaneous or time spaced multiple clutch engagements may also be used to skip speeds. It is also possible to skip speeds with a one-off/one-on strategy, such as going from $1^{st}$ to $3^{rd}$ or from $6^{th}$ to $8^{th}$. Although the first transmission 10 is shown having nine forward speeds and one reverse speeds available, the transmission 10 may utilize a control strategy that only employs a portion of the available speeds when used on a vehicle.

Example beta ratios for the four gearing-arrangements 12, 22, 32, 42 are also shown in FIG. 2. A beta ratio is a ratio between a pitch diameter of a ring-gear to a pitch diameter of a corresponding sun-gear in a planetary-gearset. In order for a planetary-gearset to function properly, the teeth on each gear-element should be of corresponding pitch so as to mesh with one another. Gear-elements having meshable teeth also provide for the beta ratios to be determined by dividing the number of teeth of a ring-gear by the number of teeth of a corresponding sun-gear. The beta ratio for the first planetary-gearset 12 is 2.273, the gearing arrangement for the second planetary-gearset 22 is 2.130, the beta ratio for the third planetary-gearset 32 is 2.333, and the beta ratio for the fourth planetary-gearset 42 is 2.529. When these beta ratios exist with the planetary-gearsets 12, 22, 32, 42 arranged as shown in FIG. 1 with the shift-elements 70, 74, 78, 80, 82, 86 engaged as shown in FIG. 2, then the speed ratios as shown in the speed ratio column, which are the ratios of the speeds of the input to the speeds of the output, are produced between the input 62 and the output 64.

For example, when the beta ratios of FIG. 2 apply to the first transmission 10, the speed ratio for the first forward speed ratio is 5.503. While the transmission is operating in the first forward speed, the transmission may shift to the second forward speed having a second forward speed ratio of 3.333. Speed ratios may be modified and tuned by changing the beta ratios, which may be done by increasing or decreasing the number of teeth on corresponding sun-gears or ring-gears. When the input 62 rotates at substantially the same speed as the output 64, the transmission provides a 1:1 ratio, as shown by the sixth speed in FIG. 2.

The far right column in FIG. 2 also shows the steps between the speed ratios, which is the previous speed ratio divided by the current speed ratio. The step between the first forward speed ratio and the second forward speed ratio is 1.651 (=5.503/3.333). Smaller speed steps may be desirable for smoother speed transitions. Smaller speed steps may also allow the engine RPM to be controlled more precisely. Smaller speed steps, however, require more speed transitions to occur as a vehicle increases in overall velocity. Larger speed shifts may be employed to allow for less speed transitions to occur. As mentioned above, when employing a three shift-element engagement per speed strategy, nine forward speeds are available, however in use, not all speeds may be employed when the transmission is used on a vehicle.

Figure 3:
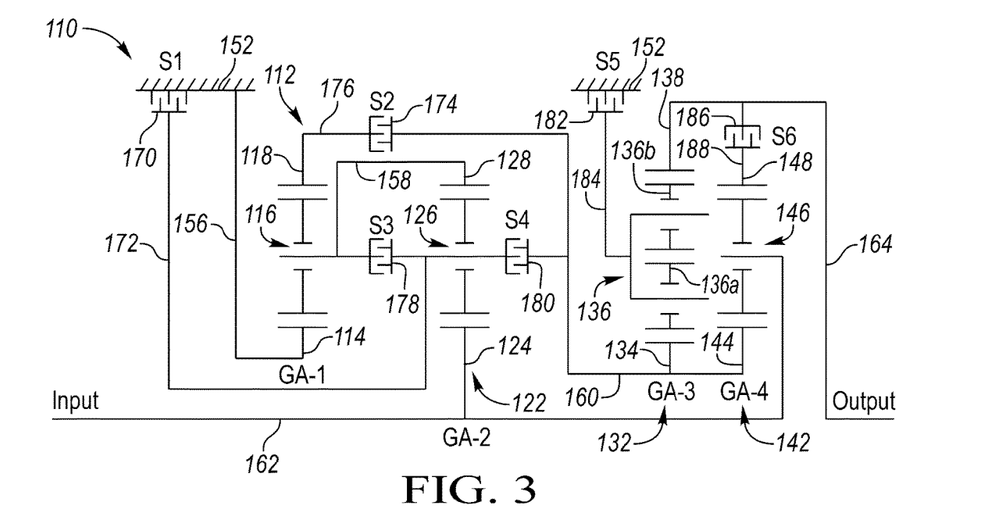
FIG. 3 is a schematic diagram of a second transmission.

FIG. 3 shows a schematic diagram of a second transmission 110. Second transmission 110 has a first gearing-arrangement 112 having gear-elements such as a first sun 114, a first carrier 116, and a first ring 118. The first gearing-arrangement 112 is shown as a simple planetary-gearset and as such the first sun 114 may also be referred to as a first end-gear 114. The first carrier 116 may be referred to as a first interior-gear 116, and the first ring 118 may be referred to as a second end-gear 118.

A second gearing-arrangement 122 is shown as a simple planetary-gearset having gear-elements of a second sun 124, a second carrier 126, and a second ring 128. The second sun 124 may be referred to as a third end-gear 124, the second carrier 126 may be referred to as a second interior-gear 126, and the second ring 128 may be referred to as a fourth end-gear 128.

A third gearing-arrangement 132 is shown as a double-pinion planetary-gearset having gear-elements such as a third sun 134, a third carrier 136, and a third ring 138. In this case, the carrier 136 has two sets of planet-gears which are disposed between the sun 134 and the ring 138. Teeth of the first planet set 136a mesh with teeth of the sun 134 (without contacting the ring 138), teeth of the second planet set 136b mesh with teeth of the ring 138 (without contacting the sun 134), and teeth of both planet sets 136a, 136b mesh with each other. The order of the LSR in this double-pinion planetary-gearset is from the sun 134 to the ring 138 to the carrier 136. As such, the third sun 134 may be referred to as a fifth end-gear 134, the third ring 138 may be referred to as a third interior-gear 138, and the third carrier 136 may be referred to as a sixth end-gear 136.

A fourth gearing-arrangement 142, is shown as a simple planetary-gearset having gear-elements such as a fourth sun 144, a fourth carrier 146, and a fourth ring 148. The fourth sun 144 may be referred to as a seventh end-gear 144, the fourth carrier 146 may be referred to as a fourth interior-gear 146, and the fourth ring 148 may be referred to as an eighth end-gear 148.

Second transmission 110 has a housing 152 which provides a non-rotating structure that a gear-element or shaft may be fixedly or selectively coupled to. A gear-element or shaft fixedly coupled to the housing may be referred to as a ground. A shift-element may be configured to selectively couple a gear-element to the housing 152 in order to hinder rotation of the gear-element. A shift-element that couples a gear-element to a ground may be referred to as a brake.

The first sun 114 is shown fixedly coupled to the housing 152 by a first shaft 156, and may be referred to as a ground. The first carrier 116 is fixedly coupled to the second ring 128 by a second shaft 158. It may also be stated that an interior-gear of the first gearing-arrangement 112 (e.g. the first interior-gear 116) is fixedly coupled to an end-gear of the second gearing-arrangement 122 (e.g. the fourth end-gear 128). The third sun 134 is fixedly coupled to the fourth sun 144 by a third shaft 160. Thus an end-gear from the third gearing-arrangement 132 (e.g. the fifth end-gear 134) is fixedly coupled to an end-gear from the fourth gearing-arrangement 142 (e.g. the seventh end-gear 144).

Input 162 is fixedly coupled to the second sun 124 and the fourth carrier 146. Said another way, the input 162 is fixedly coupled to an end-gear of the second gearing-arrangement 122 (e.g. the third end-gear 124) and an interior-gear of the fourth gearing-arrangement 142 (e.g. the fourth interior-gear 146). Output 164 is fixedly coupled to the third ring 138, which is different from the first transmission 10, but this is also an interior-gear of the third gearing-arrangement 132 (e.g. the third interior-gear 138), which is similar to the first transmission 10.

A first shift-element 170 selectively couples the second carrier 126 to the housing 152 via a fourth shaft 172. Stated more broadly, the first shift-element 170 selectively couples an interior-gear of the second gearing-arrangement 122 (e.g. the second interior-gear 126) to the housing 152.

A second shift-element 174 selectively couples the first ring 118 to the third and fourth suns 134, 144 via a fifth shaft 176 and the third shaft 160. Stated more broadly, the second shift-element 174 selectively couples an end-gear of the first gearing-arrangement 112 (e.g. the second end-gear 118) with end-gears of the third and fourth gearing-arrangements 132, 142 (e.g. the fifth and seventh end-gears 134, 144).

A third shift-element 178 selectively couples two of the gear-elements 124, 126, 128 from the second gearing-arrangement 122. The third shift-element 178 is a lock-up clutch, similar to the lock-up clutch shown in the first transmission 10, but in a different location. The third shift-element 178 selectively couples the second carrier 126 with the second ring 128. As such, the third shift-element 178 selectively couples an end-gear to an interior-gear of the second gearing-arrangement 122 (e.g. the second interior-gear 126 and the fourth end-gear 128).

A fourth shift-element 180 selectively couples the second carrier 126 to the third and fourth suns 134, 144 via the third and fourth shafts 160, 172. Stated more broadly, the fourth shift-element 180 selectively couples an interior-gear of the second gearing-arrangement 122 (e.g. the second interior-gear 126) to end-gears of the third and fourth gearing-arrangements 132, 142 (e.g. the fifth and seventh end-gears 134, 144).

A fifth shift-element 182 selectively couples the third carrier 136 to the housing 152 via a sixth shaft 184. Again, this is different from transmission 10, however, the fifth shift-element 182 still similarly selectively couples an end-gear of the third gearing-arrangement 132 (e.g. the sixth end-gear 136) to the housing 152. Like before, engagement of the fifth shift-element 182 results in one end-gear (e.g. the sixth end-gear 136) being fixed (i.e. having substantially no speed) and the other end-gear (e.g. the fifth end-gear 134) having a speed faster than the interior-gear (e.g. the third interior-gear 138 in this case).

A sixth shift-element 186 selectively couples a fourth ring 148 to the output 164 via a seventh shaft 188. Stated broader, the sixth shift-element 186 selectively couples the output 164 to an end-gear of the fourth gearing-arrangement 142 (e.g. the eighth end-gear 148).

The second transmission 110 may also follow the same shift schedule as shown in FIG. 2 providing for nine forward speeds and one reverse; however the beta ratios, speed ratios, and steps may be different. As can be seen by following the descriptions as set out above, the second transmission 110 is basically the same transmission as the first transmission 10, just with the lock-up clutch moved on the second gearing-arrangement and the third gearing-arrangement changed from a simple planetary-gearset into a double-pinion planetary-gearset.

Figure 4:
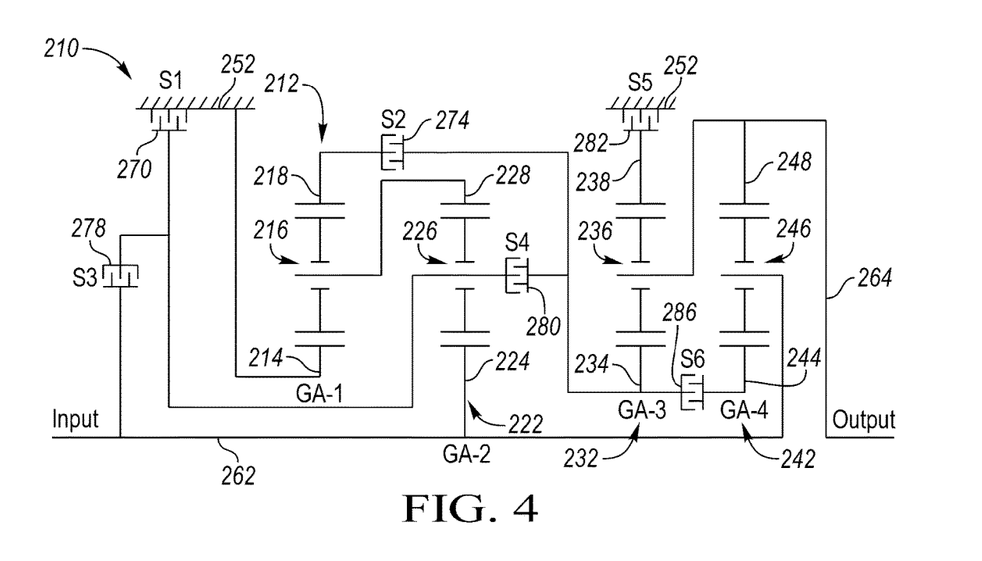
FIG. 4 is a schematic diagram of third transmission.

FIG. 4 shows a schematic diagram of a third transmission 210. A first gearing-arrangement 212 has a first sun/first end-gear 214, a first carrier/first interior-gear 216, and a first ring/second end-gear 218. A second gearing-arrangement 222 has a second sun/third end-gear 224, a second carrier/second interior-gear 226, and a second ring/fourth end-gear 228. A third gearing-arrangement 232 has a third sun/fifth end-gear 234, a third carrier/third interior-gear 236, and a third ring/sixth end-gear 238. A fourth gearing-arrangement 242 has a fourth sun/seventh end-gear 244, a fourth carrier/fourth interior-gear 246, and a fourth ring/eighth end-gear 248.

The first sun 214, or an end-gear of the first gearing-arrangement 212, is shown fixedly coupled to a housing 252. The first carrier 216, or an interior-gear of the first gearing-arrangement 212, is fixedly coupled to the second ring 228, or an end-gear of the second gearing-arrangement 222.

Input 262 is fixedly coupled to the second sun 224 and the fourth carrier 246. Said another way, the input 262 is fixedly coupled to an end-gear of the second gearing-arrangement 222 opposite the end-gear that is fixedly coupled to the interior-gear of the first gearing-arrangement 212 and an interior-gear of the fourth gearing-arrangement 242. Output 264 is fixedly coupled to the third carrier 236, similar to that of the first transmission 10, but also to the fourth ring 248. Said another way, the output 264 is fixedly coupled to an interior-gear of the third gearing arrangement 232 and an end-gear of the fourth gearing arrangement 242.

A first shift-element 270 selectively couples the second carrier 226, or the interior-gear of the second gearing-arrangement 222, to the housing 252. A second shift-element 274 selectively couples the first ring 218 to the third sun 234. Stated more broadly, the second shift-element 274 selectively couples an end-gear of the first gearing-arrangement 212 opposite the end-gear fixedly coupled to the housing 252 with an end-gear of the third gearing-arrangement 232.

A third shift-element 278 selectively couples the second sun 224 to the second carrier 226. Stated differently, the third shift-element 278 selectively couples the interior-gear with one of the end-gears of the second gearing-arrangement 222. As such, the third shift-element 278 is a lock-up clutch similar to the one shown in the first transmission 10. A fourth shift-element 280 selectively couples the second carrier 226 to the third sun 234. Stated more broadly, the fourth shift-element 280 selectively couples an interior-gear of the second gearing-arrangement 222 to the same end-gear of the third gearing-arrangement 232 with which the second shift-element 274 selectively couples.

A fifth shift-element 282 selectively couples the third ring 238 to the housing 252. Stated differently, the fifth shift-element 282 selectively couples an end-gear of the third gearing-arrangement 232 opposite the end-gear selectively coupled by the second and fourth shift-elements 274, 280 to the housing 252. Unlike the other two transmissions, the third transmission 210 has a sixth shift-element 286 selectively coupling the fourth sun 244 to the third sun 234. Stated broader, the sixth shift-element 286 selectively couples the end-gear of the third gearing-arrangement 232 that also selectively couples with the second and fourth shift-elements 274, 280 to an end-gear of the fourth gearing-arrangement 242 opposite of the end-gear that is fixedly coupled with the output 264.

The third transmission 210 may also follow the same shift schedule as shown in FIG. 2 providing for nine forward speeds and one reverse; however the beta ratios, speed ratios, and steps may be different. The third transmission 210 is basically the same transmission as the first transmission 10, with the sixth shift-element moved from one end-gear to the other end-gear on the fourth gearing-arrangement.

Figure 5:
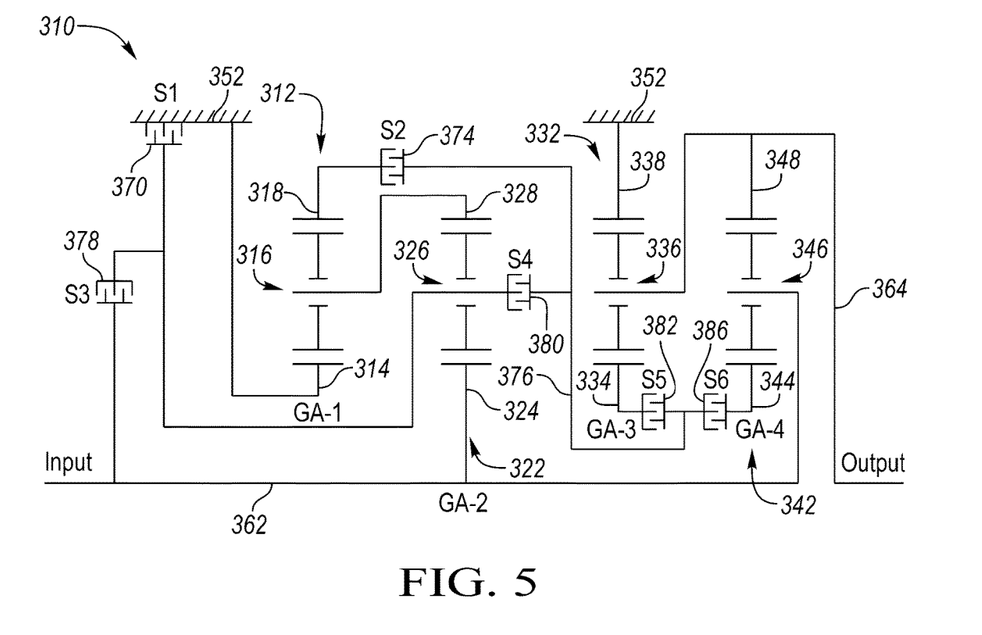
FIG. 5 is a schematic diagram of a fourth transmission.

FIG. 5 shows a schematic diagram of a fourth transmission 310. A first gearing-arrangement 312 has a first sun 314, a first carrier 316, and a first ring 318. A second gearing-arrangement 322 has a second sun 324, a second carrier 326, and a second ring 328. A third gearing-arrangement 332 has a third sun 334, a third carrier 336, and a third ring 338. A fourth gearing-arrangement 342 has a fourth sun 344, a fourth carrier 346, and a fourth ring 348.

The first sun 314, or an end-gear of the first gearing-arrangement 312, is shown fixedly coupled to a housing 352. The third ring 338, or an end-gear of the third gearing-arrangement 332, is also fixedly coupled to a housing 352. The first carrier 316, or an interior-gear of the first gearing-arrangement 312, is fixedly coupled to the second ring 328, or an end-gear of the second gearing-arrangement 322.

Input 362 is fixedly coupled to the second sun 324 and the fourth carrier 346. Said another way, the input 362 is fixedly coupled to an end-gear of the second gearing-arrangement 322 opposite the end-gear that is fixedly coupled to the interior-gear of the first gearing-arrangement 312 and an interior-gear of the fourth gearing-arrangement 342. Output 364 is fixedly coupled to the third carrier 336 and the fourth ring 348. Said another way, the output 364 is fixedly coupled to an interior-gear of the third gearing arrangement 332 and an end-gear of the fourth gearing arrangement 342.

A first shift-element 370 selectively couples the second carrier 326, or the interior-gear of the second gearing-arrangement 322, to the housing 352. A second shift-element 374 selectively couples the first ring 318 to a connecting shaft 376. Connecting shaft 376 is not fixedly coupled to any gearing-arrangements; rather it is associated with a number of shift-elements that requires at least two of the shift-elements on the connecting shaft to be engaged to transmit rotation from one gear-element on one gearing-arrangement to another gear-element on another gearing-arrangement. Stated more broadly, the second shift-element 374 selectively couples an end-gear of the first gearing-arrangement 312 opposite the end-gear fixedly coupled to the housing 352 with a connecting shaft 376.

A third shift-element 378 selectively couples the second sun 324 to the second carrier 326. Stated differently, the third shift-element 378 selectively couples the interior-gear with one of the end-gears of the second gearing-arrangement 322. As such, the third shift-element 378 is a lock-up clutch similar to the one shown in the first transmission 10. A fourth shift-element 380 selectively couples the second carrier 326 to the connecting shaft 376. Stated more broadly, the fourth shift-element 380 selectively couples an interior-gear of the second gearing-arrangement 322 to the connecting shaft 376.

A fifth shift-element 382 selectively couples the third sun 334 to the connecting shaft 376. Stated differently, the fifth shift-element 382 selectively couples an end-gear of the third gearing-arrangement 332 opposite the end-gear fixedly coupled to the housing 352 to the connecting shaft 376. A sixth shift-element 386 selectively coupling the fourth sun 344 to the connecting shaft 376 as well. Stated broader, the sixth shift-element 386 selectively couples the end-gear of the fourth gearing-arrangement 342 opposite the end-gear coupled with the output 364 to the connecting shaft 376.

The fourth transmission 310 may also follow the same shift schedule as shown in FIG. 2 providing for nine forward speeds and one reverse; however the beta ratios, speed ratios, and steps may be different. The fourth transmission 310 is basically the same transmission as the first transmission 10, with the fifth and sixth shift-elements moved from one end-gear to the other end-gear on the third and fourth gearing-arrangements.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A transmission comprising:
   four planetary-gearsets each having gear-elements including a sun, a carrier, and a ring, wherein the first planetary-gearset sun is fixedly coupled to a ground and the first planetary-gearset carrier is fixedly coupled to the second planetary-gearset ring;
   a first shift-element selectively coupling the second planetary-gearset carrier to the ground;
   a second shift-element selectively coupling the first planetary-gearset ring to a first one of the third planetary-gearset gear-elements;
   an input fixedly coupled to the second planetary-gearset sun and to a first one of the fourth planetary-gearset gear-elements; and
   an output fixedly coupled to a second one of the third planetary-gearset gear-elements.

2. The transmission of claim 1 wherein the second shift-element selectively couples the first planetary-gearset ring to the third planetary-gearset sun.

3. The transmission of claim 1 wherein the input is fixedly coupled to the fourth planetary-gearset carrier.

4. The transmission of claim 1 wherein the output is fixedly coupled to the third planetary-gearset carrier.

5. The transmission of claim 1 wherein the second shift-element further selectively couples the first planetary-gearset ring to the fourth planetary-gearset sun.

6. The transmission of claim 1 further comprising:
   a third shift-element selectively coupling two second planetary-gearset gear-elements.

7. The transmission of claim 6 wherein the wherein the two second planetary-gearset gear-elements selectively coupled by the third shift element include the second planetary-gearset carrier and the second planetary-gearset sun.

8. The transmission of claim 6 further comprising:
   a fourth shift-element selectively coupling the second planetary-gearset carrier to the third planetary-gearset sun.

9. The transmission of claim 6 further comprising:
   a fourth shift-element selectively coupling the second planetary-gearset carrier to the fourth planetary-gearset sun.

10. The transmission of claim 8 further comprising:
    a fifth shift-element selectively coupling a third one of the third planetary-gearset gear-elements to the ground.

11. The transmission of claim 10 wherein the third one of the third planetary-gearset gear-elements selectively coupled by the fifth shift element is the third planetary-gearset ring.

12. The transmission of claim 10 further comprising:
    a sixth shift-element selectively coupling a second one of the fourth planetary-gearset gear-elements to the output.

13. The transmission of claim 12 wherein the sixth shift-element selectively couples the fourth planetary-gearset ring to the output.

14. A transmission comprising:
    a first gearset having a first sun fixedly coupled to a ground, a first ring, and a first carrier;
    a second gearset having a second sun fixedly coupled to an input, a second ring fixedly coupled to the first carrier, and a second carrier;
    a third gearset having a third carrier fixedly coupled to an output; and
    a fourth plantary gearset having a fourth carrier fixedly coupled to the input.

15. The transmission of claim 14 further comprising:
    a first shift-element selectively coupling the second carrier to the ground.

16. The transmission of claim 15 further comprising:
    a second shift-element selectively coupling the first ring to a third ring of the third gearset.

17. The transmission of claim 16 further comprising:
    a third shift-element selectively coupling two of the second sun, the second ring the second carrier.

18. The transmission of claim 17 wherein the third shift-element selectively couples the second ring to the second carrier.

19. The transmission of claim 17 further comprising:
    a fourth shift-element selectively coupling the second carrier to the third ring.

20. The transmission of claim 19 further comprising:
    a fifth shift-element selectively coupling a third sun of the third gearset to the ground.

21. The transmission of claim 20 further comprising:
    a fourth ring of the fourth gearset fixedly coupled to the third ring.

22. The transmission of claim 21 further comprising:
    a sixth shift-element selectively coupling a fourth sun of the fourth gearset to the output.

23. The transmission of claim 22 wherein the first, second, third, fourth, fifth, and sixth shift-elements engage in combinations of three to provide nine forward speeds and one reverse speed.

* * * * *